United States Patent
Lu et al.

(10) Patent No.: US 12,125,189 B2
(45) Date of Patent: Oct. 22, 2024

(54) METHOD OF DETECTING PRODUCT DEFECTS, ELECTRONIC DEVICE, AND STORAGE MEDIUM

(71) Applicant: HON HAI PRECISION INDUSTRY CO., LTD., New Taipei (TW)

(72) Inventors: Chih-Te Lu, New Taipei (TW); Tzu-Chen Lin, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 383 days.

(21) Appl. No.: 17/832,925

(22) Filed: Jun. 6, 2022

(65) Prior Publication Data
US 2022/0398716 A1 Dec. 15, 2022

(30) Foreign Application Priority Data
Jun. 15, 2021 (CN) .......................... 202110662821.1

(51) Int. Cl.
*G06T 7/00* (2017.01)
*G06T 7/11* (2017.01)
*G06T 7/70* (2017.01)

(52) U.S. Cl.
CPC .............. *G06T 7/0004* (2013.01); *G06T 7/11* (2017.01); *G06T 7/70* (2017.01); *G06T 2207/20104* (2013.01)

(58) Field of Classification Search
CPC . G06T 7/0004; G06T 7/11; G06T 7/70; G06T 2207/20104; G06T 2207/20021; G06T 2207/30108; G06T 7/12; G06T 7/13; G06T 2207/30164; G06V 10/243; G06V 10/25
USPC ........................................................ 382/141
See application file for complete search history.

(56) References Cited

U.S. PATENT DOCUMENTS

| | | | | |
|---|---|---|---|---|
| 6,420,700 B2 * | 7/2002 | Ooaeh | ................ | H01J 37/3045 250/252.1 |
| 9,888,905 B2 * | 2/2018 | Okazaki | ............... | A61B 8/5207 |
| 2001/0013581 A1 * | 8/2001 | Takemoto | .............. | B82Y 40/00 250/492.22 |
| 2007/0263091 A1 * | 11/2007 | Kato | ....................... | H04N 5/46 348/E5.111 |
| 2013/0088334 A1 * | 4/2013 | Chen | ....................... | G06K 7/00 340/10.1 |
| 2019/0139223 A1 * | 5/2019 | Nie | ....................... | G06V 10/25 |

(Continued)

*Primary Examiner* — Ali Bayat
(74) *Attorney, Agent, or Firm* — ScienBiziP, P.C.

(57) ABSTRACT

A method of detecting product defects obtains an image of a product and sets a region of interest (ROI) of the image. A first contour of a first target object is detected in the region of interest. The image is detected according to the first contour to obtain a corrected image. A position difference between the first contour and a second target object in the region of interest is obtained. A second contour of the second target object is detected in the corrected image according to the position difference. A first image area corresponding to the first contour and a second image area corresponding to the second contour are segmented and input into an autoencoder. According to outputs of the autoencoder, whether the product is defective is determined. A detection result of the product is output. The method can detect defects on products quickly and accurately.

20 Claims, 4 Drawing Sheets

(56) References Cited

U.S. PATENT DOCUMENTS

2021/0073982 A1* 3/2021 Xia .................. G16H 30/20
2022/0207721 A1* 6/2022 Kim ................. G16H 30/40

* cited by examiner

METHOD OF DETECTING PRODUCT DEFECTS, ELECTRONIC DEVICE, AND STORAGE MEDIUM

FIELD

The subject matter herein generally relates to image processing, specifically a method of detecting product defects, an electronic device, and a storage medium.

BACKGROUND

In manufacturing, the detection of defects on surfaces of the products is important. An existing method of detecting product defects divides an image of a product to be detected into multiple image blocks of equal size, and inputs the image blocks into a defect detection model for product defect detection. The existing method has a slow detection speed and a low detection accuracy.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Figure 1:
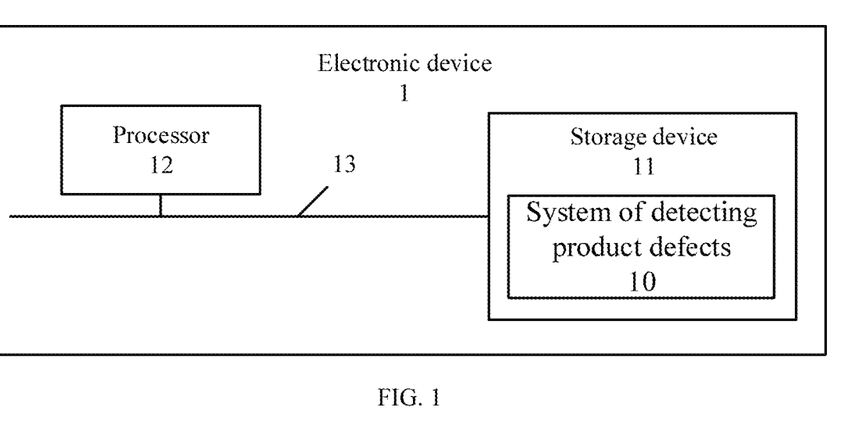
FIG. 1 is a block diagram of an electronic device implementing a method of detecting product defects in one embodiment of the present disclosure.

FIG. 1 is a block diagram of an electronic device 1 implementing a method of detecting product defects in one embodiment of the present disclosure. A system of detecting product defects 10 is run in the electronic device 1. The electronic device 1 includes, but is not limited to, a storage device 11, at least one processor 12, and at least one communication bus 13. The system of detecting product defects 10 is stored in the storage device 11 and executable by the at least one processor 12.

The at least one processor 12 may execute the system of detecting product defects 10 to implement blocks in a method as described below.

The system of detecting product defects 10 may be divided into one or more modules/units. The one or more modules/units are stored in the storage device 11 and executed by the at least one processor 12. The one or more modules/units may be a series of computer-readable instruction segments capable of performing specific functions, and the instruction segments are used to describe an execution process of the system of detecting product defects 10 in the electronic device 1.

The electronic device 1 can be any electronic product that can interact with a user, such as a personal computer, a tablet computer, a smart phone, a personal digital assistant (PDA), a smart wearable device, etc. Those skilled in the art will understand that electronic device 1 is only an example, and does not constitute a limitation. Other examples of electronic device 1 may include more or fewer components than shown in FIG. 1, or combine some components, or have different components.

Figure 2:
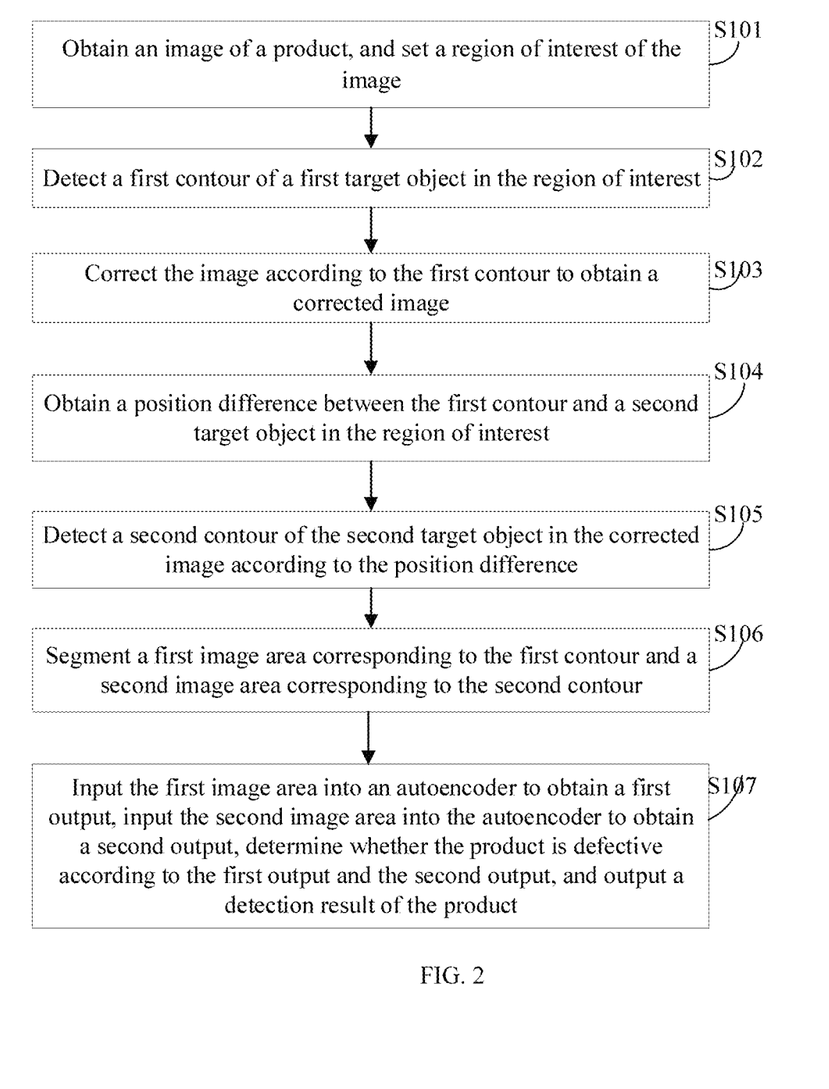
FIG. 2 is a flowchart of a method of detecting product defects in one embodiment of the present disclosure.

FIG. 2 is a flowchart of a method of detecting product defects in one embodiment. The method can detect defects on products quickly and accurately. According to different requirements, the order of the blocks in the flowchart may be changed, and some blocks may be omitted.

In block S1, the electronic device obtains an image of a product to be detected, and sets a region of interest (ROI) of the image.

The product to be detected refers to a product that needs to be examined for defects. For example, the product can be a mobile phone, a tablet computer, or other product.

In one embodiment, the electronic device may use a camera to capture the image. For example, the electronic device captures the image of a product produced in a product production line, and determines whether the product is defective by analyzing the image of the product.

Figure 4:
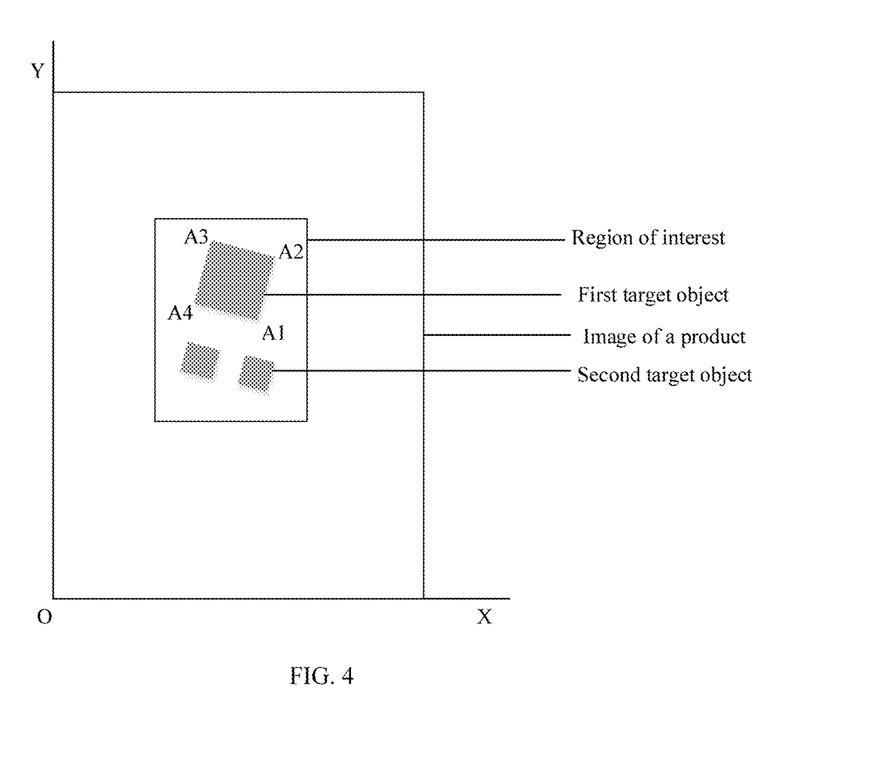
FIG. 4 shows an image of a product to be detected.

The region of interest is a region of the image that includes one or more target objects on the product. For example, the image is of a back side of a mobile phone. One target object is a logo on the back side of the mobile phone. An area containing the logo can be selected as the region of interest. The region of interest is smaller than an area of the image and larger than an area of the target object. FIG. 4 shows an image of a product to be detected. The region of interest of the image is also shown. Besides the region of interest, the image can include areas containing other non-target objects. By setting a region of interest, data processing of the image is reduced, and a detection efficiency can be improved.

In block S2, the electronic device detects a first contour of a first target object in the region of interest.

When a user captures the image of the product, an angle of shooting may deviate from a standard angle, resulting in a false detection. In order to avoid such errors, the image needs to be corrected. It is difficult to correct the entire image. One target object in the image can be selected, and the image is corrected based on the target object.

In one embodiment, the region of interest include a first target object and a second target object. For example, the product is a mobile phone, the first target object is a graphic logo on the back side of the mobile phone, and the second target object is a letter logo on the back side of the mobile phone. The region of interest is an area including the graphic logo and the letter logo.

A difference in position (position difference) between the first target object and the second target object can be determined. The position difference can be represented by coordinates.

In one embodiment, the electronic device grayscales the region of interest to obtain a grayscale image, binarizes the grayscale image to obtain a binary image, detects contours in the binary image, filters a contour of the first target object from the contours, and uses a rectangular to enframe the contour of the first target object in the binary image to obtain the first contour. Each of the contours is a closed area.

In block S3, the electronic device corrects the image according to the first contour to obtain a corrected image.

In one embodiment, the electronic device establishes a coordinate system (XOY), determines coordinates of four vertices of the first contour in the coordinate system, and calculates coordinates of a center of the first contour according to the coordinates of the four vertices. An origin (O) of the coordinate system can be a lower left corner of the image when the image is placed in a forward direction. An X-axis of the coordinate system can be a horizontal direction of the image. A Y-axis of the coordinate system can be a vertical direction of the image. The coordinates of the four vertices can be denoted as $A_1(x1,y1)$, $A_2(x2,y2)$, $A_3(x3,y3)$, and $A_4(x4,y4)$. $A_1$ is a vertex closest to the X-axis, and the vertices $A_1$, $A_2$, $A_3$, and $A_4$ are distributed in a counterclockwise order. FIG. 4 also shows a coordinate system and four vertices of the first contour in the coordinate system. The coordinate of the center of the first contour can be $$M\left(x1 - \frac{(x1-x3)}{2}, y3 - \frac{(y3-y1)}{2}\right).$$

The electronic device calculates an angle (a) between the first contour and the X-axis. A formula of calculating the angle $\alpha$ between the first contour and the X-axis can be:

$$\alpha = \arctan\left(\frac{y2-y1}{x2-x1}\right).$$

The electronic device corrects the image with the coordinate of the center of the first contour as a rotation center and the angle $\alpha$ as a rotation angle. The image is rotated clockwise to obtain the corrected image.

In one embodiment, after the block S103, the electronic device can establish a second coordinate system according to the corrected image, and determine coordinates of the four vertices of the first contour in the second coordinate system. The coordinates of the four vertices of the first contour in the second coordinate system can be denoted as $A'_1(x1',y1')$, $A'_2(x2',y2')$, $A'_3(x3',y3')$, and $A'_4(x4',y4')$. A method for establishing the second coordinate system can be the same as the method for establishing the first coordinate system.

In block S4, the electronic device obtains a position difference between the first contour and a second target object in the region of interest.

In one embodiment, the electronic device determines whether an target object in the corrected image is defective, and accordingly determines whether the product is defective. In order to determine whether the target object in the corrected image is defective, the contour of the target object needs to be obtained. In block S102, the first contour of the first target object is obtained. The position difference between the first contour and the second target object is obtained, and the contour of the second target object is determined according to the first contour and the position difference. The position difference between the first contour and the second target object can be pre-stored in the storage device 11.

In one example, with respect to FIG. 4, coordinate differences between the vertex $A_1$ of the first contour of the first target object and four vertices B1, B2, B3, and B4 of the second contour of the second target object can be obtained. The coordinate differences can be denoted as $(\Delta x1, \Delta y1)$, $(\Delta x2, \Delta y2)$, $(\Delta x3, \Delta y3)$, $(\Delta x4, \Delta y4)$.

According to the position difference, the coordinates of the second target object on the corrected image can be obtained.

In block S5, the electronic device detects a second contour of the second target object in the corrected image according to the position difference.

In one embodiment, coordinates of four vertices of the second contour of the second target object are determined according to the position difference. For example, the coordinates of the four vertices of the second contour are $B_1(x1'-\Delta x1, y1'-\Delta y1)$, $B_2(x2'-\Delta x2, y2'-\Delta y2)$, $B_3(x3'-\Delta x3, y3'-\Delta y3)$ and $B_4(x4'-\Delta x4, y4'-\Delta y4)$. According to the coordinates of the four vertices of the second contour, the second contour are obtained.

In block S6, the electronic device segments a first image area corresponding to the first contour and a second image area corresponding to the second contour.

In one embodiment, according to the coordinates of vertices of the first contour on the corrected image and the coordinates of vertices of the second contour, the electronic device segments the first image area of the first contour and the second image area of the second contour.

In block S7, the electronic device inputs the first image area into an autoencoder to obtain a first output, inputs the second image area into the autoencoder to obtain a second output, determines whether the product is defective according to the first output and the second output, and outputs a detection result of the product. The detection result indicates whether the product is defective.

The first image area is an area including the first target object. The second image area is an area including the second target object. It can be determined whether the product is defective by determining whether the first image area or the second image area corresponds to a defective target object.

In one embodiment, the first output indicates whether the first image area corresponds to a first defective region of the product, the second output indicates whether the second image area corresponds to a second defective region of the product, and determining whether the product is defective according to the first output and the second output includes: determining that the product is defective when the first image area corresponds to the first defective region or the second image area corresponds to the second defective region; and determining that the product is flawless when neither the first image area corresponds to the first defective region nor the second image area corresponds to the second defective region.

In one embodiment, the electronic device performs vectorization processing on the first image area to obtain a first feature vector, and performs vectorization processing on the second image area to obtain a second feature vector. The electronic device inputs the first feature vector into the autoencoder to obtain a first reconstructed image, and inputs the second feature vector into the autoencoder to obtain a second reconstructed image. The electronic device calculates a first reconstruction error between the first image area and the first reconstructed image, and calculates a second reconstruction error between the second image area and the second reconstructed image. It is determined whether the product is defective according to the first reconstruction error and the second reconstruction error. The electronic device can calculates a first mean square error between the first image area and pixels in the first reconstructed image as the first reconstruction error, and calculates a second mean square error between the second image area and pixels in the second reconstructed image as the second reconstruction error. The electronic device can determines that the product is defective when the first reconstruction error or the second reconstruction error is greater than a preset threshold, and determines that the product is flawless when neither the first reconstruction error nor the second reconstruction error is greater than the threshold.

Figure 3:
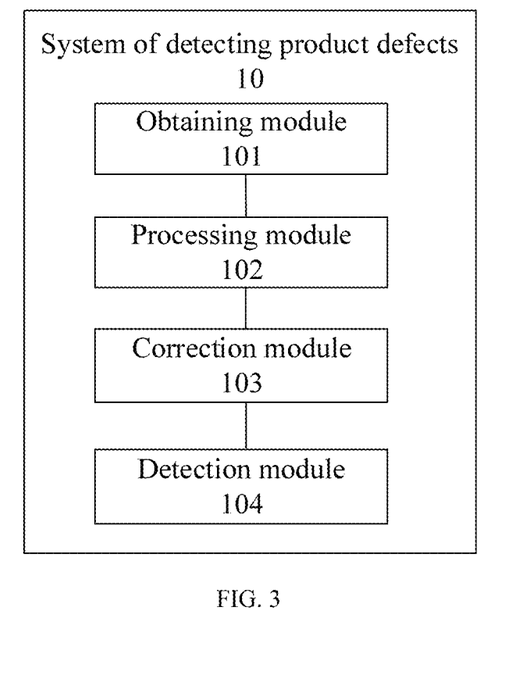
FIG. 3 is a block diagram of a system of detecting product defects in one embodiment of the present disclosure.

FIG. 3 is a block diagram of a system of detecting product defects 10 in one embodiment of the present disclosure. The system of detecting product defects 10 may be divided into one or more modules/units. The one or more modules/units are stored in the storage device 11 and executed by the at least one processor 12. The one or more modules/units may be a series of computer-readable instruction segments capable of performing specific functions, and the instruction segments are used to describe an execution process of the system of detecting product defects 10 in the electronic device 1. In the embodiment, the system of detecting product defects 10 may be divided into an obtaining module 101, a processing module 102, a correction module 103, and a detection module 104.

The obtaining module 101 is configured to obtain an image of a product, and set a region of interest of the image. The processing module 102 is configured to detect a first contour of a first target object in the region of interest. The correction module 103 is configured to correct the image according to the first contour to obtain a corrected image. The obtaining module 101 is further configured to obtain a position difference between the first contour and a second target object in the region of interest. The processing module 102 is further configured to detect a second contour of the second target object in the corrected image according to the position difference. The processing module 102 is further configured to segment a first image area corresponding to the first contour and a second image area corresponding to the second contour. The detection module 104 is further configured to input the first image area into an autoencoder to obtain a first output, input the second image area into the autoencoder to obtain a second output, determine whether the product is defective according to the first output and the second output, and output a detection result of the product.

The processor 12 may be a central processing unit (CPU) or other general-purpose processor, a digital signal processor (DSP), an application specific integrated circuit (ASIC), a field-programmable gate array (FPGA) or other programmable logic device, a discrete gate, or a transistor logic device, or a discrete hardware component, etc. The processor 12 may be a microprocessor or any conventional processor. The processor 12 may be a control center of the electronic device 1, and connect various parts of the entire electronic device 1 by using various interfaces and lines.

The storage device 11 may be used to store the computer program, and the processor 12 implements the electronic device by running or executing the computer program or module stored in the storage device 11 and calling up data stored in the storage device 11. The storage device 11 may include a storage program area and a storage data area. The storage program area may store an operating system, and programs required by at least one function, etc.; the storage data area may store data and the like created in the use of the electronic device 1. In addition, the storage device 11 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

When the modules integrated in the electronic device 1 are implemented in the form of software functional units and used as independent units, they can be stored in a non-transitory readable storage medium. According to this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

In the several embodiments provided in the preset disclosure, it should be understood that the disclosed electronic device and method may be implemented in other ways. For example, the embodiments of the electronic device described above are merely illustrative. For example, the units are only divided according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method of detecting product defects, comprising:
   obtaining an image of a product, and setting a region of interest of the image;
   detecting a first contour of a first target object in the region of interest;
   correcting the image according to the first contour to obtain a corrected image;
   obtaining a position difference between the first contour and a second target object in the region of interest;
   detecting a second contour of the second target object in the corrected image according to the position difference;
   segmenting a first image area corresponding to the first contour and a second image area corresponding to the second contour; and
   inputting the first image area into an autoencoder to obtain a first output, inputting the second image area into the autoencoder to obtain a second output, determining whether the product is defective according to the first output and the second output, and outputting a detection result of the product.

2. The method of claim 1, wherein correcting the image according to the first contour comprises:
   establishing a coordinate system, an origin of the coordinate system being a lower left corner of the image when the image is placed in a forward direction, an X-axis of the coordinate system being a horizontal direction of the image, and a Y-axis of the coordinate system being a vertical direction of the image;
   determining coordinates of four vertices of the first contour in the coordinate system, the four vertices coordinates denoted as $A_1(x1,y1)$, $A_2(x2,y2)$, $A_3(x3,y3)$, and $A_4(x4,y4)$, wherein $A_1$ is a vertex closest to the X-axis, and the vertex $A_1$, the vertex $A_2$, the vertex $A_3$, and the vertex $A_4$ are distributed in a counterclockwise order;
   calculating coordinates of a center of the first contour according to the coordinates of the four vertices;
   calculating an angle $\alpha$ between the first contour and the X-axis; and
   correcting the image with the coordinate of the center of the first contour as a rotation center and the angle $\alpha$ as a rotation angle.

3. The method of claim 2, wherein the coordinate of the center of the first contour is $$M\left(x1 - \frac{(x1-x3)}{2}, y3 - \frac{(y3-y1)}{2}\right).$$

4. The method of claim 2, wherein a formula of calculating the angle $\alpha$ between the first contour and the X-axis is:

$$\alpha = \arctan\left(\frac{y2-y1}{x2-x1}\right).$$

5. The method of claim 1, wherein the first output indicates whether the first image area corresponds to a first defective region of the product, the second output indicates whether the second image area corresponds to a second defective region of the product, and determining whether the product is defective according to the first output and the second output comprises:
   determining that the product is defective when the first image area corresponds to the first defective region or the second image area corresponds to the second defective region; and
   determining that the product is flawless when neither the first image area corresponds to the first defective region nor the second image area corresponds to the second defective region.

6. The method of claim 1, wherein inputting the first image area into an autoencoder to obtain a first output, inputting the second image area into the autoencoder to obtain a second output, determining whether the product is defective according to the first output and the second output comprises:
   performing vectorization processing on the first image area to obtain a first feature vector, and performing vectorization processing on the second image area to obtain a second feature vector;
   inputting the first feature vector into the autoencoder to obtain a first reconstructed image, and inputting the second feature vector into the autoencoder to obtain a second reconstructed image;
   calculating a first reconstruction error between the first image area and the first reconstructed image, and calculating a second reconstruction error between the second image area and the second reconstructed image; and
   determining whether the product is defective according to the first reconstruction error and the second reconstruction error.

7. The method of claim 6, wherein calculating a first reconstruction error between the first image area and the first reconstructed image comprises:
   calculating a first mean square error between the first image area and pixels in the first reconstructed image as the first reconstruction error; and
   calculating a second reconstruction error between the second image area and the second reconstructed image comprises:
   calculating a second mean square error between the second image area and pixels in the second reconstructed image as the second reconstruction error.

8. The method of claim 6, wherein determining whether the product is defective according to the first reconstruction error and the second reconstruction error comprises:
   determining that the product is defective when the first reconstruction error or the second reconstruction error is greater than a preset threshold; and
   determining that the product is flawless when neither the first reconstruction error nor the second reconstruction error is greater than the threshold.

9. An electronic device comprising:
   at least one processor; and a storage device storing computer-readable instructions, which when executed by the at least one processor, cause the at least one processor to:
obtain an image of a product, and set a region of interest of the image;
detect a first contour of a first target object in the region of interest;
correct the image according to the first contour to obtain a corrected image;
obtain a position difference between the first contour and a second target object in the region of interest;
detect a second contour of the second target object in the corrected image according to the position difference;
segment a first image area corresponding to the first contour and a second image area corresponding to the second contour; and
input the first image area into an autoencoder to obtain a first output, input the second image area into the autoencoder to obtain a second output, determine whether the product is defective according to the first output and the second output, and output a detection result of the product.

10. The electronic device of claim 9, wherein the at least one processor is further caused to:
establish a coordinate system, an origin of the coordinate system being a lower left corner of the image when the image is placed in a forward direction, an X-axis of the coordinate system being a horizontal direction of the image, and a Y-axis of the coordinate system being a vertical direction of the image;
determine coordinates of four vertices of the first contour in the coordinate system, the coordinates of four vertices denoted as $A_1(x1,y1)$, $A_2(x2,y2)$, $A_3(x3,y3)$, and $A_4(x4,y4)$, wherein $A_1$ is a vertex closest to the X-axis, and the vertex $A_1$, the vertex $A_2$, the vertex $A_3$, and the vertex $A_4$ are distributed in a counterclockwise order;
calculate coordinates of a center of the first contour according to the coordinates of the four vertices;
calculate an angle α between the first contour and the X-axis; and
correct the image with the coordinate of the center of the first contour as a rotation center and the angle α as a rotation angle.

11. The electronic device of claim 10, wherein the coordinate of the center of the first contour is $$M\left(x1 - \frac{(x1 - x3)}{2}, y3 - \frac{(y3 - y1)}{2}\right).$$

12. The electronic device of claim 10, wherein a formula of calculating the angle α between the first contour and the X-axis is:

$$\alpha = \arctan\left(\frac{y2 - y1}{x2 - x1}\right).$$

13. The electronic device of claim 9, wherein the first output indicates whether the first image area corresponds to a first defective region of the product, the second output indicates whether the second image area corresponds to a second defective region of the product, and the at least one processor is further caused to:
determine that the product is defective when the first image area corresponds to the first defective region or the second image area corresponds to the second defective region; and
determine that the product is flawless when neither the first image area corresponds to the first defective region nor the second image area corresponds to the second defective region.

14. The electronic device of claim 9, wherein the at least one processor is further caused to:
perform vectorization processing on the first image area to obtain a first feature vector, and perform vectorization processing on the second image area to obtain a second feature vector;
input the first feature vector into the autoencoder to obtain a first reconstructed image, and input the second feature vector into the autoencoder to obtain a second reconstructed image;
calculate a first reconstruction error between the first image area and the first reconstructed image, and calculate a second reconstruction error between the second image area and the second reconstructed image; and
determine whether the product is defective according to the first reconstruction error and the second reconstruction error.

15. A non-transitory storage medium having stored thereon computer-readable instructions that, when the computer-readable instructions are executed by a processor to implement the following method:
obtaining an image of a product, and setting a region of interest of the image;
detecting a first contour of a first target object in the region of interest;
correcting the image according to the first contour to obtain a corrected image;
obtaining a position difference between the first contour and a second target object in the region of interest;
detecting a second contour of the second target object in the corrected image according to the position difference;
segmenting a first image area corresponding to the first contour and a second image area corresponding to the second contour; and
inputting the first image area into an autoencoder to obtain a first output, inputting the second image area into the autoencoder to obtain a second output, determining whether the product is defective according to the first output and the second output, and outputting a detection result of the product.

16. The non-transitory storage medium of claim 15, wherein correcting the image according to the first contour comprises:
establishing a coordinate system, an origin of the coordinate system being a lower left corner of the image when the image is placed in a forward direction, an X-axis of the coordinate system being a horizontal direction of the image, and a Y-axis of the coordinate system being a vertical direction of the image;
determining coordinates of four vertices of the first contour in the coordinate system, the coordinates of the four vertices denoted as $A_1(x1,y1)$, $A_2(x2,y2)$, $A_3(x3,y3)$, and $A_4(x4,y4)$, wherein $A_1$ is a vertex closest to the X-axis, and the vertex $A_1$, the vertex $A_2$, the vertex $A_3$, and the vertex $A_4$ are distributed in a counterclockwise order;
calculating coordinates of a center of the first contour according to the coordinates of the four vertices;
calculating an angle α between the first contour and the X-axis; and correcting the image with the coordinate of the center of the first contour as a rotation center and the angle α as a rotation angle.

17. The non-transitory storage medium of claim 16, wherein the coordinate of the center of the first contour is $$M\left(x1 - \frac{(x1 - x3)}{2}, y3 - \frac{(y3 - y1)}{2}\right).$$

18. The non-transitory storage medium of claim 16, wherein a formula of calculating the angle α between the first contour and the X-axis is:

$$\alpha = \arctan\left(\frac{y2 - y1}{x2 - x1}\right).$$

19. The non-transitory storage medium of claim 15, wherein the first output indicates whether the first image area corresponds to a first defective region of the product, the second output indicates whether the second image area corresponds to a second defective region of the product, and determining whether the product is defective according to the first output and the second output comprises:

determining that the product is defective when the first image area corresponds to the first defective region or the second image area corresponds to the second defective region; and determining that the product is flawless when neither the first image area corresponds to the first defective region nor the second image area corresponds to the second defective region.

20. The non-transitory storage medium of claim 15, wherein inputting the first image area into an autoencoder to obtain a first output, inputting the second image area into the autoencoder to obtain a second output, determining whether the product is defective according to the first output and the second output comprises:

performing vectorization processing on the first image area to obtain a first feature vector, and performing vectorization processing on the second image area to obtain a second feature vector;

inputting the first feature vector into the autoencoder to obtain a first reconstructed image, and inputting the second feature vector into the autoencoder to obtain a second reconstructed image;

calculating a first reconstruction error between the first image area and the first reconstructed image, and calculating a second reconstruction error between the second image area and the second reconstructed image; and determining whether the product is defective according to the first reconstruction error and the second reconstruction error.

* * * * *